(12) United States Patent
Su et al.

(10) Patent No.: US 11,990,961 B2
(45) Date of Patent: May 21, 2024

(54) METHOD FOR DETERMINING ANTENNA PORT AND COMMUNICATION DEVICE

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Xueyuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 51 days.

(21) Appl. No.: 17/620,923

(22) PCT Filed: Jun. 17, 2020

(86) PCT No.: PCT/CN2020/096508
§ 371 (c)(1),
(2) Date: Dec. 20, 2021

(87) PCT Pub. No.: WO2021/004242
PCT Pub. Date: Jan. 14, 2021

(65) Prior Publication Data
US 2022/0352939 A1  Nov. 3, 2022

(30) Foreign Application Priority Data
Jul. 5, 2019 (CN) .......................... 201910606396.7

(51) Int. Cl.
*H04B 7/0413* (2017.01)
*H04B 7/06* (2006.01)
(Continued)

(52) U.S. Cl.
CPC ......... *H04B 7/0617* (2013.01); *H04B 7/0413* (2013.01); *H04B 7/063* (2013.01);
(Continued)

(58) Field of Classification Search
CPC ..... H04B 7/0413; H04B 7/0617; H04B 7/063
(Continued)

(56) References Cited

U.S. PATENT DOCUMENTS

2018/0227886 A1  8/2018  Chou et al.
2019/0069285 A1  2/2019  Chandrasekhar et al.
(Continued)

FOREIGN PATENT DOCUMENTS

| CN | 108092754 A | 5/2018 |
|---|---|---|
| CN | 109787663 A | 5/2019 |

(Continued)

OTHER PUBLICATIONS

Extended European Search Report dated Jul. 25, 2022 in European Application No. 20837586.5.
(Continued)

*Primary Examiner* — Leila Malek
(74) *Attorney, Agent, or Firm* — Harness, Dickey & Pierce, P.L.C.

(57) ABSTRACT

The present disclosure provides a method for determining an antenna port and a communication device. The method includes: transmitting control information, the control information including a first information field, the first information field being used to indicate antenna port information of a plurality of antenna port sets; and determining an antenna port set corresponding to each TCI state in a plurality of TCI states, and determining antenna ports in the plurality of antenna port sets in accordance with the first information field. There is a correspondence between the TCI states and the antenna port sets.

15 Claims, 2 Drawing Sheets transmitting control information — 201 determining an antenna port set corresponding to each TCI state in a plurality of TCI states, and determining antenna ports in each antenna port set in accordance with the first information field — 202

(51) Int. Cl.
  *H04L 5/00* (2006.01)
  *H04W 72/23* (2023.01)
(52) U.S. Cl.
  CPC .......... *H04L 5/0048* (2013.01); *H04L 5/0094* (2013.01); *H04W 72/23* (2023.01)
(58) Field of Classification Search
  USPC ........................................................ 375/262
  See application file for complete search history.

(56) References Cited

U.S. PATENT DOCUMENTS

| | | | |
|---|---|---|---|
| 2019/0115955 A1 | 4/2019 | Wilson et al. | |
| 2020/0015200 A1* | 1/2020 | Vilaipornsawai | H04W 72/23 |
| 2020/0280416 A1 | 9/2020 | Gao et al. | |
| 2020/0280483 A1 | 9/2020 | Zhang et al. | |
| 2020/0383096 A1 | 12/2020 | Yang et al. | |

FOREIGN PATENT DOCUMENTS

| | | | | |
|---|---|---|---|---|
| CN | 109802787 A | | 5/2019 | |
| CN | 109803423 A | | 5/2019 | |
| WO | WO-2020197564 A1 * | 10/2020 | ........... | H04L 1/0025 |

OTHER PUBLICATIONS

Huawei et al., "Summary of AI: 7.2.8.2 Enhancements on Multi-TRP/Panel Transmission of Offline Discussion," 3GPP TSG RAN WG1 meeting #96, R1-1903541, Feb. 27, 2019.

"3rd Generation Partnership Project; Technical Specification Group Radio Access Network; NR; Multiplexing and channel coding (release 15)," 3GPP Standard; 3GPP TS 38.212 (3GPP), V15.6.0, Jun. 24, 2019.

Huawei et al., "Single PDCCH based multi-TRP/panel transmission," 3GPP TSG RAN WG1 Meeting #97, R1-1906037, May 13, 2019.

Chinese Office Action dated May 26, 2021 for Chinese Application No. 201910606396.7.

LG Electronics, Discussion on DMRS port indication for NCJT, Agenda item 7.2.8.5, 3GPP TSG RAN WG1 #97, R1-1906738, May 13-17, 2019, Reno, USA.

Ericsson, "On multi-TRP and multi-panel", 3GPP TSG RAN WG1 Meeting RAN1#97, R1-1907697, May 13-17, 2019, Reno, US.

Written Opinion and International Search Report for International Application No. PCT/CN2020/096508 dated Jan. 11, 2022.

* cited by examiner

METHOD FOR DETERMINING ANTENNA PORT AND COMMUNICATION DEVICE

CROSS-REFERENCE TO RELATED APPLICATIONS

The present application is the U.S. national phase of PCT Application No. PCT/CN2020/096508 filed on Jun. 17, 2020, which claims a priority of the Chinese Patent application 201910606396.7 filed on Jul. 5, 2019, which are each incorporated herein by reference in their entirety.

TECHNICAL FIELD

The present disclosure relates to the field of communication technology, in particular to a method for determining an antenna port and a communication device.

BACKGROUND

Some communications systems support a Coordinated Multiple Point (CoMP) technology. For example, a multi-Transmission Reception Point (TRP) or multi-panel transmission technology is introduced into a $5^{th}$-Generation (5G) communications system. However, in the communications system, merely one group of Demodulation Reference Signal (DMRS) antenna ports are indicated by a network side to a terminal, so during the multi-TRP or multi-panel transmission, the multiple TRPs or panels are constrained to merely use the same quantity of layers for the transmission, i.e., they merely support the transmission in one Transmission Configuration Indication (TCI) state, so frequency band utilization of the communications system is relatively low.

SUMMARY

An object of the present disclosure is to provide a method for determining an antenna port and a communication device, so as to solve the problem in the related art where the frequency band utilization of the communications system is relatively low.

In one aspect, the present disclosure provides in some embodiments a method for determining an antenna port, including: transmitting control information, the control information including a first information field, the first information field being used to indicate antenna port information of a plurality of antenna port sets; and determining an antenna port set corresponding to each TCI state in a plurality of TCI states, and determining antenna ports in the plurality of antenna port sets in accordance with the first information field. There is a correspondence between the TCI states and the antenna port sets.

In accordance with some possible embodiments of the present disclosure, the control information further includes a second information field, the second information field is used to indicate DMRS antenna ports, and the DMRS antenna ports include the antenna ports in the plurality of antenna port sets.

In accordance with some possible embodiments of the present disclosure, frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

In accordance with some possible embodiments of the present disclosure, the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

In accordance with some possible embodiments of the present disclosure, the determining the antenna ports in the plurality of antenna port sets includes: determining antenna ports corresponding to the quantity of ports in each antenna port set from the DMRS antenna ports in accordance with a first predetermined antenna port selection rule; or determining antenna ports corresponding to the ranks for each antenna port set from the DMRS antenna ports in accordance with a second predetermined antenna port selection rule.

In accordance with some possible embodiments of the present disclosure, there is a constant correspondence between the TCI states and the antenna port sets; or the correspondence between the TCI states and the antenna port sets is dynamically indicated by the first information field.

In accordance with some possible embodiments of the present disclosure, the first information field includes a first value, and the second information field includes a second value. The determining the antenna ports in the plurality of antenna port sets in accordance with the first information field includes determining a first DMRS antenna port indicated by the second value in a second configuration, and determining the antenna ports in the plurality of antenna port sets indicated by the first value in a first configuration in the case that a DMRS antenna port is the first DMRS antenna port. The second configuration is configured to configure a plurality of values, and a DMRS antenna port corresponding to each value. The first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

In another aspect, the present disclosure provides in some embodiments a communication device, including: a transmission module configured to transmit control information, the control information including a first information field, the first information field being used to indicate antenna port information of a plurality of antenna port sets; and a determination module configured to determine an antenna port set corresponding to each TCI state in a plurality of TCI states, and determine antenna ports in the plurality of antenna port sets in accordance with the first information field. There is a correspondence between the TCI states and the antenna port sets.

In accordance with some possible embodiments of the present disclosure, the control information further includes a second information field, the second information field is used to indicate DMRS antenna ports, and the DMRS antenna ports include the antenna ports in the plurality of antenna port sets.

In accordance with some possible embodiments of the present disclosure, frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

In accordance with some possible embodiments of the present disclosure, the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

In accordance with some possible embodiments of the present disclosure, the determination module is further configured to determine an antenna port set corresponding to each TCI state in the plurality of TCI states, and determine antenna ports corresponding to the quantity of ports in each antenna port set from the DMRS antenna ports in accordance with a first predetermined antenna port selection rule; or determine an antenna port set corresponding to each TCI state in the plurality of TCI states, and determine antenna ports corresponding to the ranks for each antenna port set from the DMRS antenna ports in accordance with a second predetermined antenna port selection rule.

In accordance with some possible embodiments of the present disclosure, there is a constant correspondence between the TCI states and the antenna port sets; or the correspondence between the TCI states and the antenna port sets is dynamically indicated by the first information field.

In accordance with some possible embodiments of the present disclosure, the first information field includes a first value, and the second information field includes a second value. The determination module is further configured to determine an antenna port set corresponding to each TCI state in the plurality of TCI states, determine a first DMRS antenna port indicated by the second value in a second configuration, and determine the antenna ports in the plurality of antenna port sets indicated by the first value in a first configuration in the case that a DMRS antenna port is the first DMRS antenna port. The second configuration is configured to configure a plurality of values, and a DMRS antenna port corresponding to each value. The first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

In yet another aspect, the present disclosure provides in some embodiments a communication device, including a transceiver, a memory, a processor, and a program stored in the memory and executed by the processor. The transceiver is configured to transmit control information, the control information includes a first information field, the first information field is used to indicate antenna port information of a plurality of antenna port sets, the transceiver is further configured to determine an antenna port set corresponding to each TCI state in a plurality of TCI states and determine antenna ports in the plurality of antenna port sets in accordance with the first information field, and there is a correspondence between the TCI states and the antenna port sets; or the transceiver is configured to transmit control information, the control information includes a first information field, the first information field is used to indicate antenna port information of a plurality of antenna port sets, the processor is configured to determine an antenna port set corresponding to each TCI state in a plurality of TCI states and determine antenna ports in the plurality of antenna port sets in accordance with the first information field, and there is a correspondence between the TCI states and the antenna port sets.

In accordance with some possible embodiments of the present disclosure, the control information further includes a second information field, the second information field is used to indicate DMRS antenna ports, and the DMRS antenna ports include the antenna ports in the plurality of antenna port sets.

In accordance with some possible embodiments of the present disclosure, frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

In accordance with some possible embodiments of the present disclosure, the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

In accordance with some possible embodiments of the present disclosure, the determining the antenna ports in the plurality of antenna port sets includes: determining antenna ports corresponding to the quantity of ports in each antenna port set from the DMRS antenna ports in accordance with a first predetermined antenna port selection rule; or determining antenna ports corresponding to the ranks for each antenna port set from the DMRS antenna ports in accordance with a second predetermined antenna port selection rule.

In accordance with some possible embodiments of the present disclosure, there is a constant correspondence between the TCI states and the antenna port sets; or the correspondence between the TCI states and the antenna port sets is dynamically indicated by the first information field.

In accordance with some possible embodiments of the present disclosure, the first information field includes a first value, and the second information field includes a second value. The determining the antenna ports in the plurality of antenna port sets includes determining a first DMRS antenna port indicated by the second value in a second configuration, and determining the antenna ports in the plurality of antenna port sets indicated by the first value in a first configuration in the case that a DMRS antenna port is the first DMRS antenna port. The second configuration is configured to configure a plurality of values, and a DMRS antenna port corresponding to each value. The first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

In still yet another aspect, the present disclosure provides in some embodiments a computer-readable storage medium storing therein a computer program. The computer program is executed by a processor so as to implement steps of the above-mentioned method.

According to the embodiments of the present disclosure, the control information including the first information field is transmitted, and the first information field is used to indicate the antenna port information of the plurality of antenna port sets. Then, the antenna port set corresponding to each TCI state in the plurality of TCI states is determined, and the antenna ports in the plurality of antenna port sets are determined in accordance with the first information field. There is a correspondence between the TCI states and the antenna port sets. As a result, it is able to determine the antenna port set corresponding to each TCI state, thereby to support the transmission in multiple TCI states, and improve the frequency band utilization of the communications system.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
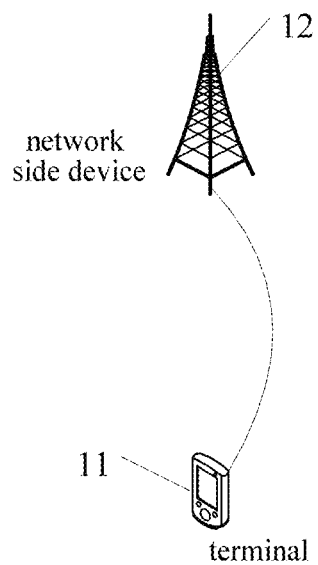
FIG. 1 is a schematic view showing an available network according to some embodiments of the present disclosure.

FIG. 1 shows an available network according to some embodiments of the present disclosure. As shown in FIG. 1, the network includes a terminal 11 and a network side device 12. The terminal 11 is a User Equipment (UE) or any other terminal device, e.g., mobile phone, tablet personal computer, laptop computer, Personal Digital Assistant (PDA), Mobile Internet Device (MID), wearable device, robot or vehicle. It should be appreciated that, a specific type of the terminal will not be particularly defined herein. The network side device 12 is a base station, e.g., macro base station, Long Term Evolution (LTE) evolved Node B (eNB), or 5G New Radio (NR) NB. The network side device is also a micro base station, e.g., Low Power Node (LPN), pico base station, femto base station, or Access Point (AP). In addition, the network side device is also a network node consisting of a Central Unit (CU) and a plurality of TRPs managed and controlled by the CU. It should be appreciated that, a specific type of the network side device will not be particularly defined herein.

It should be appreciated that, the schemes in the embodiments of the present disclosure may be applied to a communications system supporting a coordinated multiple point technology, e.g., a 5G communications system. Of course, the schemes may also be applied to any subsequently-evolved communications systems, or a $4^{th}$-Generation (4G) communications system.

Figure 2:
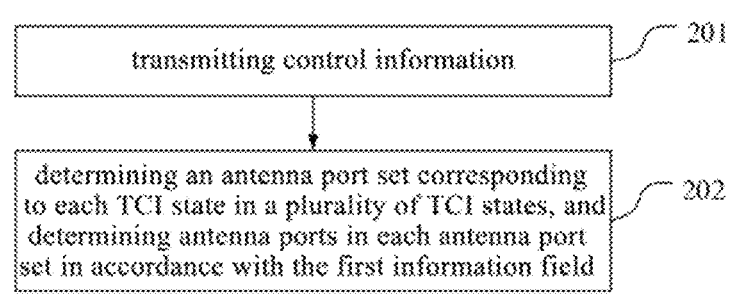
FIG. 2 is a flow chart of a method for determining an antenna port according to some embodiments of the present disclosure.

The present disclosure provides in some embodiments a method for determining an antenna port which, as shown in FIG. 2, includes: Step 201 of transmitting control information, the control information including a first information field, the first information field being used to indicate antenna port information of a plurality of antenna port sets; and Step 202 of determining an antenna port set corresponding to each TCI state in a plurality of TCI states, and determining antenna ports in the plurality of antenna port sets in accordance with the first information field. There is a correspondence between the TCI states and the antenna port sets.

It should be appreciated that, the method for determining the antenna port in the embodiments of the present disclosure may be applied to a communication device, and the communication device is a terminal or a network side device.

The control information is transmitted by the network side device to the terminal. In other words, in the case that the communication device is the terminal, the control information is received in Step 201. Alternatively in the case that the communication device is the network side device, the control information is transmitted in Step 201.

The antenna port information of the plurality of antenna port sets indicated by the first information field include identifiers of the antenna ports in the plurality of antenna port sets in the plurality of antenna port sets, i.e., the first information field is used to indicate the antenna ports in the plurality of antenna port sets. Alternatively, the antenna port information is the quantity of antenna ports or ranks corresponding to the quantity of antenna ports. The antenna ports in the plurality of antenna port sets are determined in accordance with the antenna port information.

The plurality of TCI states is configured by the network side device for the terminal. Of course, the present disclosure is not limited thereto. For example, the plurality of TCI states is requested by the terminal, or configured by the terminal itself.

In addition, in some embodiments of the present disclosure, one TCI state corresponds to one TRP or one beam in a TRP.

The correspondence between the TCI states and the antenna port sets is configured in advance, e.g., the correspondence is a constant correspondence or is indicated dynamically, and one TCI state corresponds to one antenna port set.

In addition, in some embodiments of the present disclosure, the quantities of antenna ports in different antenna port sets are the same or different. For example, a TCI state 0 corresponds to a port set (0,1), and a TCI state 1 corresponds to a port set (0).

According to the embodiments of the present disclosure, through the above steps, the antenna port set corresponding to each TCI state in the plurality of TCI states is determined, so as to support the transmission in multiple TCI states. In other words, it is able for multiple TRPs or panels to use different quantities of layers, rather than the same quantity of layers, for transmission. As a result, it is able to prevent the total quantity of used layers from being limited, thereby to improve the frequency band utilization of the communications system.

After determining the antenna ports in the plurality of antenna port sets, the transmission is performed in each TCI state. During the transmission in each TCI state, the antenna ports in the corresponding antenna port set are used. Because the transmission is performed in multiple TCI states, it is able to improve the transmission performance.

In accordance with some possible embodiments of the present disclosure, frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

For example, in a Time Division Multiplexing (TDM) transmission scheme, the time-domain resources corresponding to the plurality of TCI states do not overlap each other. In a Frequency Division Multiplexing (FDM) transmission scheme, the frequency-domain resources corresponding to the plurality of TCI states do not overlap each other; And in a TDM+FDM transmission scheme, the time-domain resources corresponding to the plurality of TCI states do not overlap each other and the frequency-domain resources corresponding to the plurality of TCI states do not overlap each other.

In the embodiments of the present disclosure, because the resources corresponding to the plurality of TCI states do not overlap each other, during the transmission in the plurality of TCI states, it is able to achieve better transmission performance.

Of course, the present disclosure is not limited thereto. For example, when a specific transmission scheme, e.g., the TDM, the FDM or the TDM+FDM transmission scheme, is designated at a network side, the antenna port set corresponding to each TCI state and the antenna ports in the plurality of antenna port sets are also determined in the above-mentioned way.

In accordance with some possible embodiments of the present disclosure, the control information further includes a second information field, the second information field is used to indicate DMRS antenna ports, and the DMRS antenna ports include the antenna ports in the plurality of antenna port sets.

The DMRS antenna ports (also called as DMRS port(s)) indicated by the second information field are an antenna port union set. For example, the antenna port union set is a union set of the antenna ports in the plurality of antenna port sets indicated by the first information field.

When the DMRS antenna ports include the antenna ports in the plurality of antenna port sets, a union set of the antenna ports in the plurality of antenna port sets includes the DMRS antenna ports, or a part of the DMRS antenna ports. For example, when the DMRS antenna ports are (0,1), a TCI state 0 corresponds to a port set (0,1), and a TCI state 1 corresponds to a port set (0).

The second information field is used to indicate the DMRS antenna ports, the first information field is used to indicate the antenna port information of the plurality of antenna port sets, and there is the correspondence between the TCI states and the antenna port sets, so it is able to directly and rapidly determine the antenna port set corresponding to each TCI state and determine the antenna ports in the plurality of antenna port sets.

In accordance with some possible embodiments of the present disclosure, the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

The identification information of the antenna ports is information for identifying the antenna ports, so it is able to directly determine the antenna ports in the plurality of antenna port sets in accordance with the identification information. For example, the first information field is individually used to indicate several sub-sets in the port sets indicated by the DMRS port(s), and one sub-set is a port set indicated by the DMRS port(s). For example, when the port set indicated by the DMRS port(s) is (0,1), it may be determined in accordance with the individual first information field that a first port set is (0,1) and a second port set is (0).

In accordance with some possible embodiments of the present disclosure, the determining the antenna ports in the plurality of antenna port sets includes: determining antenna ports corresponding to the quantity of ports in each antenna port set from the DMRS antenna ports in accordance with a first predetermined antenna port selection rule; or determining antenna ports corresponding to the ranks for each antenna port set from the DMRS antenna ports in accordance with a second predetermined antenna port selection rule.

The first predetermined antenna port selection rule and the second predetermined antenna port selection rule are agreed in a protocol, or configured by the network side device for the terminal. The first predetermined antenna port selection rule is used to determine the corresponding antenna ports from the DMRS antenna ports in accordance with the quantity of antenna ports, and the second predetermined antenna port selection rule is used to determine the corresponding antenna ports from the DMRS antenna ports in accordance with the ranks.

For example, in the case that the first information field is used to indicate the quantity of antenna ports in the plurality of antenna port sets, the communication device determines the antenna ports in the plurality of antenna port sets in accordance with a predetermined way. For example, the communication device determines first N, last N, or middle N antenna ports from the DMRS antenna ports indicated by the second information field as the antenna ports in the plurality of antenna port sets, where N represents the quantity of ports in a certain antenna port set. In this way, the network side device and the terminal determine the antenna ports in the antenna port set in a same way, so it is able to achieve consistency between the network side device and the terminal. For example, when the DMRS antenna ports are (0,1), the quantity of ports in the first antenna port set is 2, and the quantity of ports in a second antenna port set is 1, then it is determined that the first antenna port set is (0,1), and the second antenna port set is (0), in accordance with a first mode. On the other hand, when the DMRS antenna ports are (0,1), the quantity of ports in the first antenna port set is 2, and the quantity of ports in a second antenna port set is 1, then it is determined that the first antenna port set is (0,1), and the second antenna port set is (1), in accordance with a second mode. The network side device and the terminal determine the antenna ports in the plurality of antenna port sets in a same way.

In the case that the first information field is used to indicate the ranks corresponding to the quantity of ports in the plurality of antenna port sets, there is a correspondence between the quantities of antenna ports and the ranks, so it is able to determine the quantity of ports in each antenna port set in accordance with the rank, and then determine the antenna ports in the plurality of antenna port sets. For example, the first information field is individually used to indicate a rank group, e.g., rank A+B represents that the first port set includes A ports and the second port set includes B ports, where max(A,B)=R. The ports in each port set are determined in accordance with the rank group in conjunction with the predetermined selection rule (e.g., the second predetermined antenna port selection rule) as well as the port sets indicated by the DMRS port(s). For example, the first port set includes first A ports in the port set indicated by the DMRS port(s), and the second port set includes first B ports in the port set indicated by the DMRS port(s).

For ease of description, in some embodiments of the present disclosure, a maximum value of the quantity of DMRS antenna ports corresponding to each TCI state is R.

In accordance with some possible embodiments of the present disclosure, the plurality of TCI states includes a first TCI state and a second TCI state. An antenna port set corresponding to the first TCI state includes the DMRS ports, and an antenna port set corresponding to the second TCI state includes a subset of the DMRS antenna ports.

The plurality of TCI states includes one or more first TCI states, and one or more second TCI states.

When the antenna port set corresponding to the first TCI state includes the DMRS antenna ports, in the port sets corresponding to the plurality of TCI states, the antenna port set corresponding to the TCI state and having the largest quantity of ports includes the antenna port sets corresponding to all the TCI states. For example, when an antenna port union set is (0,1), the TCI state 0 corresponds to a port set (0,1), and the TCI state 1 corresponds to a port set (0).

In the embodiments of the present disclosure, different quantities of antenna ports are configured for the TCI states, so as to improve the transmission flexibility, meet the requirements on different services and scenarios, and further improve the overall frequency band utilization.

In accordance with some possible embodiments of the present disclosure, there is a constant correspondence between the TCI states and the antenna port sets; or the correspondence between the TCI states and the antenna port sets is dynamically indicated by the first information field.

Some TCI states in the plurality of TCI states correspond to a same antenna port set. Of course, different TCI states may correspond to different antenna port sets, and there is a correspondence between the TCI states and the antenna port sets.

For example, in the constant correspondence, the TCI state 0 is mapped to the first port set, and the TCI state 1 is mapped to the second port set.

The dynamic correspondence between the port sets and the TCI states depends on a value in an antenna port configuration (e.g., a DMRS table). For example, for a first value (e.g., value A), the TCI state 0 is mapped to the first port set, and the TCI state 1 is mapped to the second port set. For another value (e.g., value B), the TCI state 0 is mapped to the second port set, and the TCI state 1 is mapped to the first port set.

Through the constant correspondence, it is able to save an overhead for the antenna port configuration, and through the correspondence dynamically indicated by the first information field, it is able to improve the flexibility of the antenna port configuration.

In accordance with some possible embodiments of the present disclosure, the first information field includes a first value, and the second information field includes a second value. The determining the antenna ports in the plurality of antenna port sets in accordance with the first information field includes determining a first DMRS antenna port indicated by the second value in a second configuration, and determining the antenna ports in the plurality of antenna port sets indicated by the first value in a first configuration in the case that a DMRS antenna port is the first DMRS antenna port. The second configuration is configured to configure a plurality of values, and a DMRS antenna port corresponding to each value. The first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

The second configuration is configured by the network side device for the terminal in advance, or agreed in a protocol. The second configuration is a DMRS table, or a port configuration in any other form, and it is at least configured with the second value for indicating the DMRS antenna ports. For example, each value in a part of, or all of, values in the DMRS table is at least use to indicate the DMRS antenna ports, and the DMRS antenna ports are a union set of the port sets corresponding to the plurality of TCI states (i.e., a maximum set, DMRS port(s)), e.g., the port set (0,1) mentioned hereinabove.

In addition, the first configuration is configured by the network side device for the terminal in advance, or agreed in a protocol. Table 1 to Table 4 show the first configuration, and the first value in the first information field is a certain value corresponding to indication information in Tables 1 to 4.

TABLE 1 antenna ports in the plurality of antenna port sets in the case of fixed mapping (TCI state 0 is mapped to the first port set, and TCI state 1 is mapped to the second port set)

| Indication information | Meaning |
| --- | --- |
| 0 | When a port set indicated by DMRS port(s) is (0), the first port set is (0), and the second port set is (0) When a port set indicated by DMRS port(s) is (0, 1), the first port set is (0, 1), and the second port set is (0, 1) |
| 1 | When a port set indicated by DMRS port(s) is (0, 1), the first port set is (0, 1), and the second port set is (0) |
| 2 | When a port set indicated by DMRS port(s) is (0, 1), the first port set is (0), and the second port set is (0, 1) |

It should be appreciated that, the port set indicated by the DMRS port(s) in Tables 1 and 2 include the DMRS antenna ports mentioned hereinabove.

TABLE 2 antenna ports in the plurality of antenna port sets in the case of dynamical mapping (the correspondence between the TCI states and the antenna port sets is dynamically indicated by the first information field)

| Indication information | Meaning |
| --- | --- |
| 0 | When a port set indicated by DMRS port(s) is (0), the first port set is (0), the second port set is (0), the TCI state 0 corresponds to the first port set, and the TCI state 1 corresponds to the second port set When a port set indicated by DMRS port(s) is (0, 1), the first port set is (0, 1), the second port set is (0, 1), the TCI state 0 corresponds to the first port set, and the TCI state 1 corresponds to the second port set |
| 1 | When a port set indicated by DMRS port(s) is (0, 1), the first port set is (0, 1), the second port set is (0), the TCI state 0 corresponds to the first port set, and the TCI state 1 corresponds to the second port set |
| 2 | When a port set indicated by DMRS port(s) is (0, 1), the first port set is (0, 1), the second port set is (0), the TCI state 1 corresponds to the first port set, and the TCI state 0 corresponds to the second port set |

TABLE 3 the quantity of antenna ports in the plurality of antenna port sets in the case of fixed mapping (the TCI state 0 is mapped to the first port set and the TCI state 1 is mapped to the second port set)

| Indication information | Meaning |
| --- | --- |
| 0 | the quantity of ports in the first port set = the quantity of ports in the second port set = R |
| 1 | the quantity of ports in the first port set = R, and the quantity of ports in the second port set = R − 1 |
| 2 | the quantity of ports in the second port set = R, and the quantity of ports in the first port set = R − 1 |

TABLE 4 the quantity of antenna ports in the plurality of antenna port sets in the case of dynamical mapping (the correspondence between the TCI states and the antenna port sets is dynamically indicated by the first information field)

| Indication information | Meaning |
| --- | --- |
| 0 | the quantity of ports in the first port set = the quantity of ports in the second port set = R, the TCI state 0 corresponds to the first port set, and the TCI state 1 corresponds to the second port set |
| 1 | the quantity of ports in the first port set = R, the quantity of ports in the second port set = R − 1, the TCI state 0 corresponds to the first port set, and the TCI state 1 corresponds to the second port set |
| 2 | the quantity of ports in the first port set = R, the quantity of ports in the second port set = R − 1, the TCI state 1 corresponds to the first port set, and the TCI state 0 corresponds to the second port set |

According to the embodiments of the present disclosure, the control information including the first information field is transmitted, and the first information field is used to indicate the antenna port information of the plurality of antenna port sets. Then, the antenna port set corresponding to each TCI state in the plurality of TCI states is determined, and the antenna ports in the plurality of antenna port sets are determined in accordance with the first information field. There is a correspondence between the TCI states and the antenna port sets. As a result, it is able to determine the antenna port set corresponding to each TCI state, thereby to support the transmission in multiple TCI states, and improve the frequency band utilization of the communications system.

Figure 3:
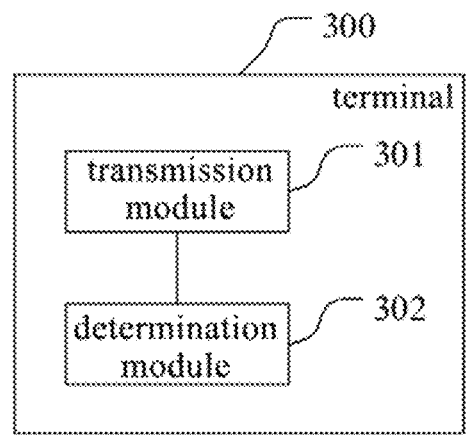
FIG. 3 is a schematic view showing a communication device according to some embodiments of the present disclosure.

The present disclosure further provides in some embodiments a communication device, which is a terminal or a network side device. As shown in FIG. 3, the communication device 300 includes: a transmission module 301 configured to transmit control information, the control information including a first information field, the first information field being used to indicate antenna port information of a plurality of antenna port sets; and a determination module 302 configured to determine an antenna port set corresponding to each TCI state in a plurality of TCI states, and determine antenna ports in the plurality of antenna port sets in accordance with the first information field. There is a correspondence between the TCI states and the antenna port sets.

In accordance with some possible embodiments of the present disclosure, the control information further includes a second information field, the second information field is used to indicate DMRS antenna ports, and the DMRS antenna ports include the antenna ports in the plurality of antenna port sets.

In accordance with some possible embodiments of the present disclosure, frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

In accordance with some possible embodiments of the present disclosure, the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

In accordance with some possible embodiments of the present disclosure, the determination module 302 is further configured to determine an antenna port set corresponding to each TCI state in the plurality of TCI states, and determine antenna ports corresponding to the quantity of ports in each antenna port set from the DMRS antenna ports in accordance with a first predetermined antenna port selection rule; or determine an antenna port set corresponding to each TCI state in the plurality of TCI states, and determine antenna ports corresponding to the ranks for each antenna port set from the DMRS antenna ports in accordance with a second predetermined antenna port selection rule.

In accordance with some possible embodiments of the present disclosure, there is a constant correspondence between the TCI states and the antenna port sets; or the correspondence between the TCI states and the antenna port sets is dynamically indicated by the first information field.

In accordance with some possible embodiments of the present disclosure, the first information field includes a first value, and the second information field includes a second value. The determination module is further configured to determine an antenna port set corresponding to each TCI state in the plurality of TCI states, determine a first DMRS antenna port indicated by the second value in a second configuration, and determine the antenna ports in the plurality of antenna port sets indicated by the first value in a first configuration in the case that a DMRS antenna port is the first DMRS antenna port. The second configuration is configured to configure a plurality of values, and a DMRS antenna port corresponding to each value. The first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

It should be appreciated that, the communication device 300 may be that mentioned in the above method embodiments, and the implementation of the communication device 300 may refer to that of the method mentioned hereinabove with a same beneficial effect, which will thus not be particularly defined herein.

Figure 4:
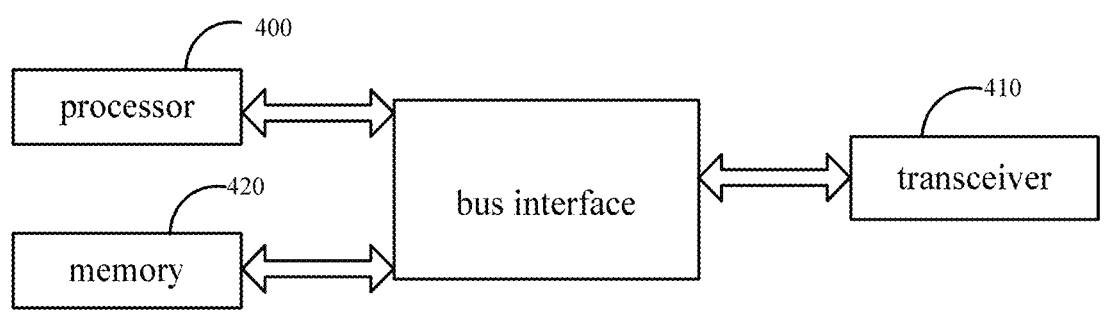
FIG. 4 is another schematic view showing the communication device according to some embodiments of the present disclosure.

The present disclosure further provides in some embodiments a communication device which is a terminal or a network side device. As shown in FIG. 4, the communication device includes a transceiver 410, a memory 420, a processor 400, and a program stored in the memory 420 and executed by the processor 400. The transceiver 410 is configured to transmit control information, the control information includes a first information field, the first information field is used to indicate antenna port information of a plurality of antenna port sets, the transceiver 410 is further configured to determine an antenna port set corresponding to each TCI state in a plurality of TCI states and determine antenna ports in the plurality of antenna port sets in accordance with the first information field, and there is a correspondence between the TCI states and the antenna port sets; alternatively the transceiver 410 is configured to transmit control information, the control information includes a first information field, the first information field is used to indicate antenna port information of a plurality of antenna port sets, the processor 400 is configured to determine an antenna port set corresponding to each TCI state in a plurality of TCI states and determine antenna ports in the plurality of antenna port sets in accordance with the first information field, and there is a correspondence between the TCI states and the antenna port sets.

In FIG. 4, bus architecture includes a number of buses and bridges connected to each other, so as to connect various circuits for one or more processors 400 and one or more memories 420. In addition, as is known in the art, the bus architecture may be used to connect any other circuits, such as a circuit for a peripheral device, a circuit for a voltage stabilizer and a power management circuit. A bus interface is provided, and the transceiver 410 consists of a plurality of elements, i.e., a transmitter and a receiver for communication with any other devices over a transmission medium. The processor 400 takes charge of managing the bus architecture as well as general processings. The memory 420 stores therein data for the operation of the processor 400.

It should be appreciated that, apart from being provided on the communication device, the memory 420 may also be arranged at a geographical position different from the processor 400.

In accordance with some possible embodiments of the present disclosure, the control information further includes a second information field, the second information field is used to indicate DMRS antenna ports, and the DMRS antenna ports include the antenna ports in the plurality of antenna port sets.

In accordance with some possible embodiments of the present disclosure, frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

In accordance with some possible embodiments of the present disclosure, the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

In accordance with some possible embodiments of the present disclosure, the determining the antenna ports in the plurality of antenna port sets includes: determining antenna ports corresponding to the quantity of ports in each antenna port set from the DMRS antenna ports in accordance with a first predetermined antenna port selection rule; or determining antenna ports corresponding to the ranks for each antenna port set from the DMRS antenna ports in accordance with a second predetermined antenna port selection rule.

In accordance with some possible embodiments of the present disclosure, there is a constant correspondence between the TCI states and the antenna port sets; or the correspondence between the TCI states and the antenna port sets is dynamically indicated by the first information field.

In accordance with some possible embodiments of the present disclosure, the first information field includes a first value, and the second information field includes a second value. The determining the antenna ports in the plurality of antenna port sets includes determining a first DMRS antenna port indicated by the second value in a second configuration, and determining the antenna ports in the plurality of antenna port sets indicated by the first value in a first configuration in the case that a DMRS antenna port is the first DMRS antenna port. The second configuration is configured to configure a plurality of values, and a DMRS antenna port corresponding to each value. The first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

It should be appreciated that, the communication device may be that mentioned in the above method embodiments, and the implementation of the communication device 300 may refer to that of the method mentioned hereinabove with a same beneficial effect, which will thus not be particularly defined herein.

The present disclosure further provides in some embodiments a computer-readable storage medium storing therein a computer program. The computer program is executed by a processor so as to implement steps of the above-mentioned method for determining the antenna port.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the embodiments of the present disclosure are implemented by hardware, software, firmware, middleware, microcode or a combination thereof. For the hardware implementation, the processor includes one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure is implemented through modules capable of achieving the functions in the present disclosure (e.g., processes or functions). Software codes are stored in the memory and executed by the processor. The memory is implemented inside or outside the processor.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for determining an antenna port, performed by a communication device, comprising:
    transmitting control information, the control information comprising a first information field and a second information field, wherein the first information field is used to indicate antenna port information of a plurality of antenna port sets, and the second information field is used to indicate Demodulation Reference Signal (DMRS) antenna ports, and the DMRS antenna ports comprise the antenna ports of each antenna port set in the plurality of antenna port sets;

determining an antenna port set corresponding to each Transmission Configuration Indication (TCI) state in a plurality of TCI states, and determining antenna ports of each antenna port set in the plurality of antenna port sets in accordance with the first information field, wherein there is a correspondence between the TCI states and the antenna port sets; and transceiving, by the communication device, data over the determined antenna ports of each antenna port set in the plurality of antenna port sets, wherein the first information field comprises a first value, and the second information field comprises a second value;

the determining the antenna ports in the plurality of antenna port sets in accordance with the first information field comprises determining a first DMRS antenna port indicated by the second value in a second configuration, and determining the antenna ports in the plurality of antenna port sets indicated by the first value in a first configuration in the case that a DMRS antenna port is the first DMRS antenna port;

the second configuration is configured to configure a plurality of values, and a DMRS antenna port corresponding to each value; and the first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

2. The method according to claim 1, wherein frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

3. The method according to claim 1, wherein the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

4. The method according to claim 3, wherein the determining the antenna ports in the plurality of antenna port sets comprises:

determining antenna ports corresponding to the quantity of ports in each antenna port set from the DMRS antenna ports in accordance with a first predetermined antenna port selection rule; or determining antenna ports corresponding to the ranks for each antenna port set from the DMRS antenna ports in accordance with a second predetermined antenna port selection rule.

5. The method according to claim 1, wherein there is a constant correspondence between the TCI states and the antenna port sets; or the correspondence between the TCI states and the antenna port sets is dynamically indicated by the first information field.

6. A communication device, comprising a transceiver, a memory, a processor, and a program stored in the memory and executed by the processor, wherein the transceiver is configured to transmit control information, the control information comprises a first information field and a second information field, wherein the first information field is used to indicate antenna port information of a plurality of antenna port sets, and the second information field is used to indicate Demodulation Reference Signal (DMRS) antenna ports, and the DMRS antenna ports comprise the antenna ports of each antenna port set in the plurality of antenna port sets, the transceiver is further configured to determine an antenna port set corresponding to each Transmission Configuration Indication (TCI) state in a plurality of TCI states and determine antenna ports of each antenna port set in the plurality of antenna port sets in accordance with the first information field, and there is a correspondence between the TCI states and the antenna port sets, and transceive data over the determined antenna ports of each antenna port set in the plurality of antenna port sets;

wherein the first information field comprises a first value, and the second information field comprises a second value;

the determining the antenna ports in the plurality of antenna port sets in accordance with the first information field comprises determining a first DMRS antenna port indicated by the second value in a second configuration, and determining the antenna ports in the plurality of antenna port sets indicated by the first value in a first configuration in the case that a DMRS antenna port is the first DMRS antenna port;

the second configuration is configured to configure a plurality of values, and a DMRS antenna port corresponding to each value; and the first configuration is configured to configure at least one value, and antenna ports in the plurality of antenna port sets corresponding to each value in the case of at least one DMRS antenna port; or the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or the first configuration is configured to configure at least one value, and the quantity of antenna ports in the plurality of antenna port sets corresponding to each value in the case of at least one DMRS antenna port; or the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

7. The communication device according to claim 6, wherein frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

8. The communication device according to claim 6, wherein the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

9. The communication device according to claim 8, wherein the determining the antenna ports in the plurality of antenna port sets comprises: determining antenna ports corresponding to the quantity of ports in each antenna port set from the DMRS antenna ports in accordance with a first predetermined antenna port selection rule; or determining antenna ports corresponding to the ranks for each antenna port set from the DMRS antenna ports in accordance with a second predetermined antenna port selection rule.

10. The communication device according to claim 6, wherein there is a constant correspondence between the TCI states and the antenna port sets; or the correspondence between the TCI states and the antenna port sets is dynamically indicated by the first information field.

11. A non-transitory computer-readable storage medium storing therein a computer program, wherein the computer program is executed by a processor so as to implement steps in a method for determining an antenna port, comprising:
transmitting control information, the control information comprising a first information field and a second information field, wherein the first information field is used to indicate antenna port information of a plurality of antenna port sets and the second information field is used to indicate Demodulation Reference Signal (DMRS) antenna ports, and the DMRS antenna ports comprise the antenna ports of each antenna port set in the plurality of antenna port sets;
determining an antenna port set corresponding to each Transmission Configuration Indication (TCI) state in a plurality of TCI states, and determining antenna ports of each antenna port set in the plurality of antenna port sets in accordance with the first information field, wherein there is a correspondence between the TCI states and the antenna port sets; and
transceiving data over the determined antenna ports of each antenna port set in the plurality of antenna port sets,
wherein the first information field comprises a first value, and the second information field comprises a second value;
the determining the antenna ports in the plurality of antenna port sets in accordance with the first information field comprises determining a first DMRS antenna port indicated by the second value in a second configuration, and determining the antenna ports in the plurality of antenna port sets indicated by the first value in a first configuration in the case that a DMRS antenna port is the first DMRS antenna port;
the second configuration is configured to configure a plurality of values, and a DMRS antenna port corresponding to each value; and
the first configuration is configured to configure at least one value, and antenna ports in the plurality of antenna port sets corresponding to each value in the case of at least one DMRS antenna port; or
the first configuration is configured to configure at least one value, antenna ports in the plurality of antenna port sets corresponding to each value in the case of at least one DMRS antenna port, and a correspondence between the TCI states and the antenna port sets corresponding to each value in the case of at least one DMRS antenna port; or
the first configuration is configured to configure at least one value, and the quantity of antenna ports in the plurality of antenna port sets corresponding to each value in the case of at least one DMRS antenna port; or
the first configuration is configured to configure at least one value, the quantity of ports in each antenna port set corresponding to each value in the case of at least one DMRS antenna port, and a correspondence between the TCI states and the antenna port sets corresponding to each value in the case of at least one DMRS antenna port.

12. The non-transitory computer-readable storage medium according to claim 11, wherein frequency-domain resources corresponding to the plurality of TCI states do not overlap each other; or time-domain resources corresponding to the plurality of TCI states do not overlap each other; or the time-domain resources corresponding to the plurality of TCI states do not overlap each other and the frequency-domain resources corresponding to the plurality of TCI states do not overlap each other.

13. The non-transitory computer-readable storage medium according to claim 11, wherein the first information field is used to indicate identification information of the antenna ports in the plurality of antenna port sets; or the first information field is used to indicate the quantity of ports in the plurality of antenna port sets; or the first information field is used to indicate ranks corresponding to the quantity of antenna ports in the plurality of antenna port sets.

14. The non-transitory computer-readable storage medium according to claim 13, wherein the determining the antenna ports in the plurality of antenna port sets comprises:
determining antenna ports corresponding to the quantity of ports in each antenna port set from the DMRS antenna ports in accordance with a first predetermined antenna port selection rule; or
determining antenna ports corresponding to the ranks for each antenna port set from the DMRS antenna ports in accordance with a second predetermined antenna port selection rule.

15. The non-transitory computer-readable storage medium according to claim 11, wherein there is a constant correspondence between the TCI states and the antenna port sets; or the correspondence between the TCI states and the antenna port sets is dynamically indicated by the first information field.

* * * * *